(12) United States Patent
Leem

(10) Patent No.: US 10,529,484 B2
(45) Date of Patent: Jan. 7, 2020

(54) COIL DEVICE OF WIRELESS POWER TRANSFER SYSTEM

(71) Applicant: LG INNOTEK CO., LTD., Seoul (KR)

(72) Inventor: Sung Hyun Leem, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 197 days.

(21) Appl. No.: 15/291,755

(22) Filed: Oct. 12, 2016

(65) Prior Publication Data
US 2017/0103849 A1    Apr. 13, 2017

(30) Foreign Application Priority Data
Oct. 13, 2015  (KR) .................. 10-2015-0143103

(51) Int. Cl.
| | | |
|---|---|---|
| *H01F 38/00* | (2006.01) | |
| *H01F 38/14* | (2006.01) | |
| *H02J 50/12* | (2016.01) | |
| *H01F 41/10* | (2006.01) | |

(52) U.S. Cl.
CPC .............. *H01F 38/14* (2013.01); *H01F 41/10* (2013.01); *H02J 50/12* (2016.02)

(58) Field of Classification Search
CPC .. H02J 50/00; H02J 7/00; H01F 38/14; H01F 27/00; H01F 38/00; H01F 28/00; H01F 5/00
USPC .......................................................... 307/104
See application file for complete search history.

(56) References Cited

U.S. PATENT DOCUMENTS

| | | | | |
|---|---|---|---|---|
| 2005/0174209 A1* | 8/2005 | Teshima | ................. | H01F 5/003 336/200 |
| 2008/0164839 A1* | 7/2008 | Kato | ...................... | H02J 7/025 320/108 |
| 2011/0102125 A1* | 5/2011 | Tamura | ............... | H01F 27/2871 336/232 |
| 2012/0268232 A1* | 10/2012 | Yamada | .............. | H01F 27/2823 336/222 |
| 2013/0194060 A1* | 8/2013 | Nakada | ................... | H01F 27/00 336/192 |
| 2014/0111023 A1 | 4/2014 | Kagami et al. | | |

(Continued)

FOREIGN PATENT DOCUMENTS

| | | |
|---|---|---|
| CN | 103782483 A | 5/2014 |
| JP | 62-282424 A | 12/1987 |

(Continued)

*Primary Examiner* — Rexford N Barnie
*Assistant Examiner* — Joseph N Inge
(74) *Attorney, Agent, or Firm* — Birch, Stewart, Kolasch & Birch, LLP

(57) ABSTRACT

There are provided a coil device, a method for manufacturing the coil, and a wireless power transfer system-charger or a wireless power transfer system-device, which includes the coil device. A coil device includes: a substrate including first and second terminals; and a first coil disposed on one surface of the substrate, the first coil being disposed while turning at least once, wherein the first coil includes a plurality of wires self-bonded to be stacked on the substrate, wherein one sides of the plurality of wires are commonly connected to the first terminal, and the other sides of the plurality of wires are commonly connected to the second terminal.

12 Claims, 11 Drawing Sheets

(56) References Cited

U.S. PATENT DOCUMENTS

2015/0130577 A1* 5/2015 Hongzhong .......... H01F 27/323
                                                      336/192
2015/0288196 A1* 10/2015 Park ....................... H02J 5/005
                                                      307/104
2016/0049234 A1   2/2016 Kawashima et al.

FOREIGN PATENT DOCUMENTS

| JP | 9-129470 A | 5/1997 |
| JP | 2003-330161 A | 11/2003 |
| JP | 2012-34445 A | 2/2012 |
| KR | 10-1181816 B1 | 9/2012 |
| KR | 10-2014-0111554 A | 9/2014 |
| WO | WO 2014/171140 A1 | 10/2014 |

* cited by examiner

[Fig. 1]
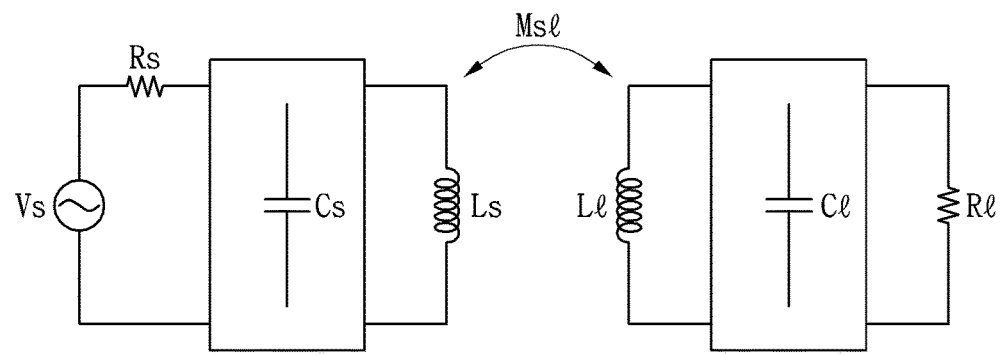
[Fig. 2]
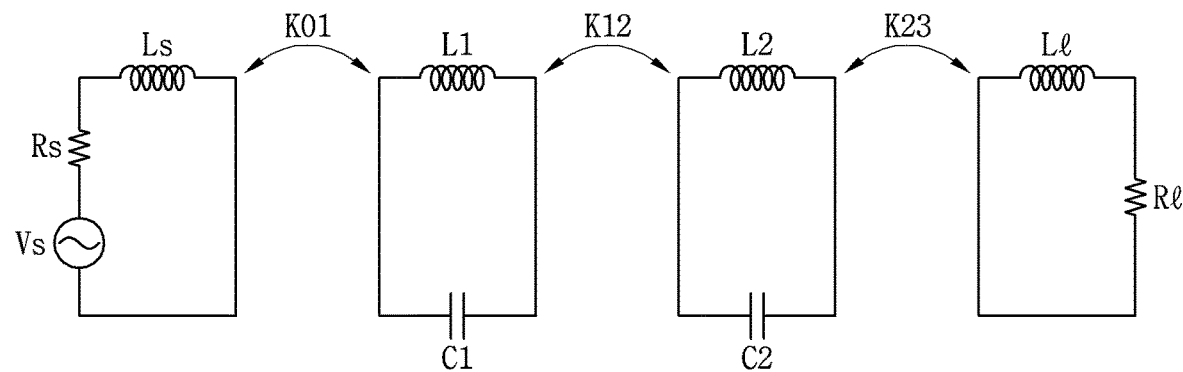

[Fig. 3A]
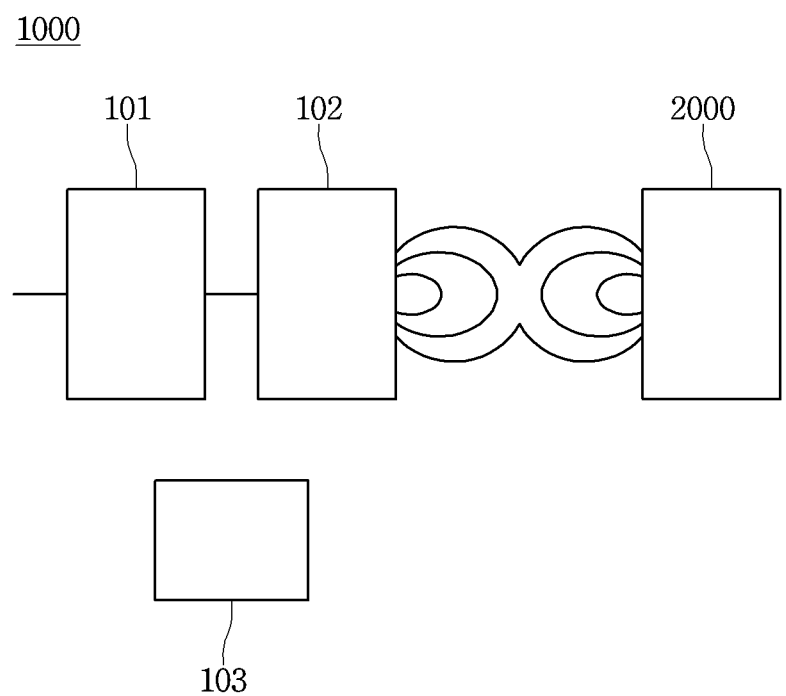

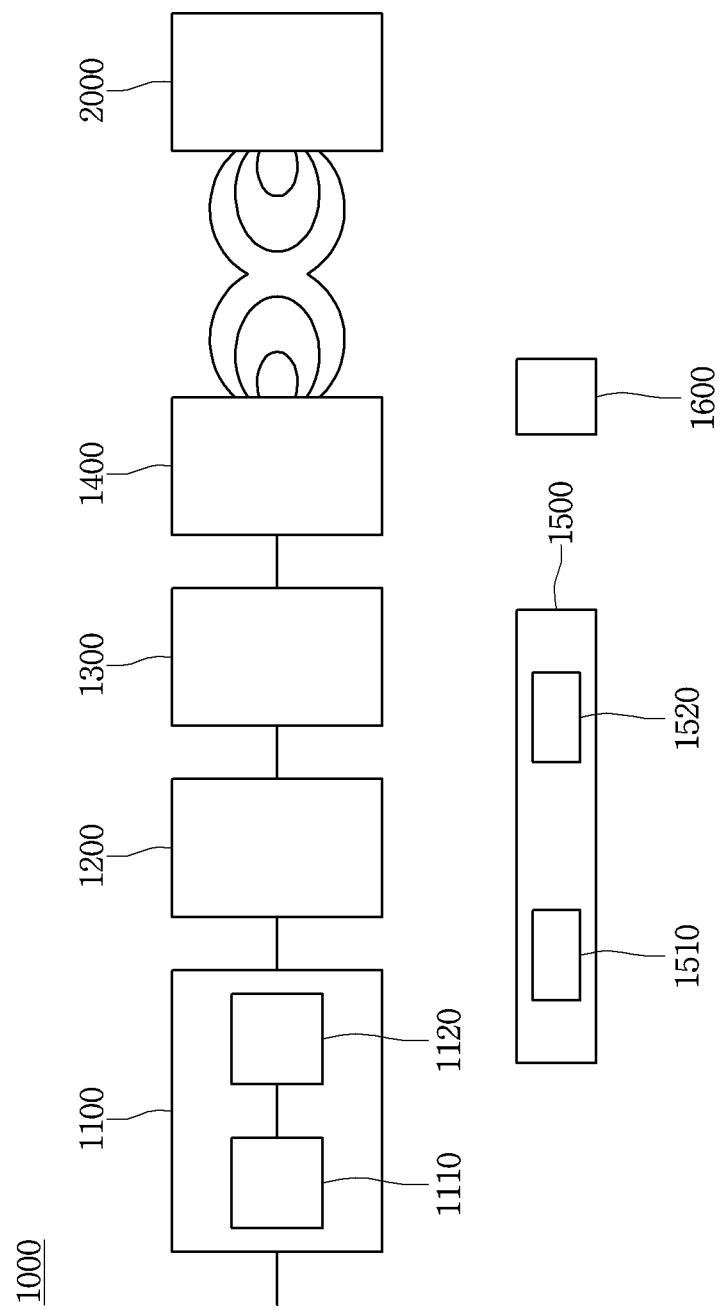
[Fig. 3B]

[Fig. 4A]
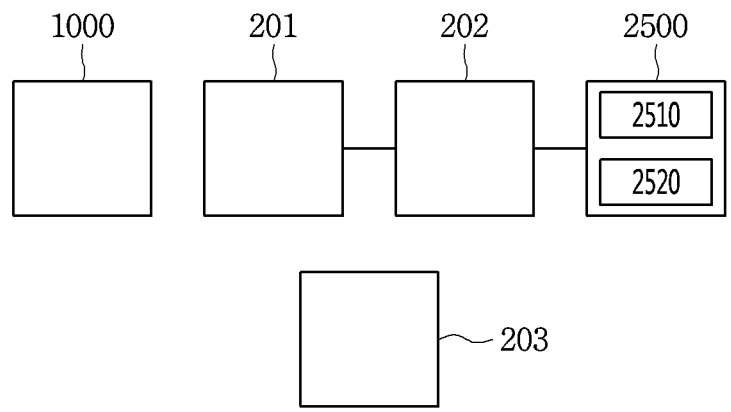

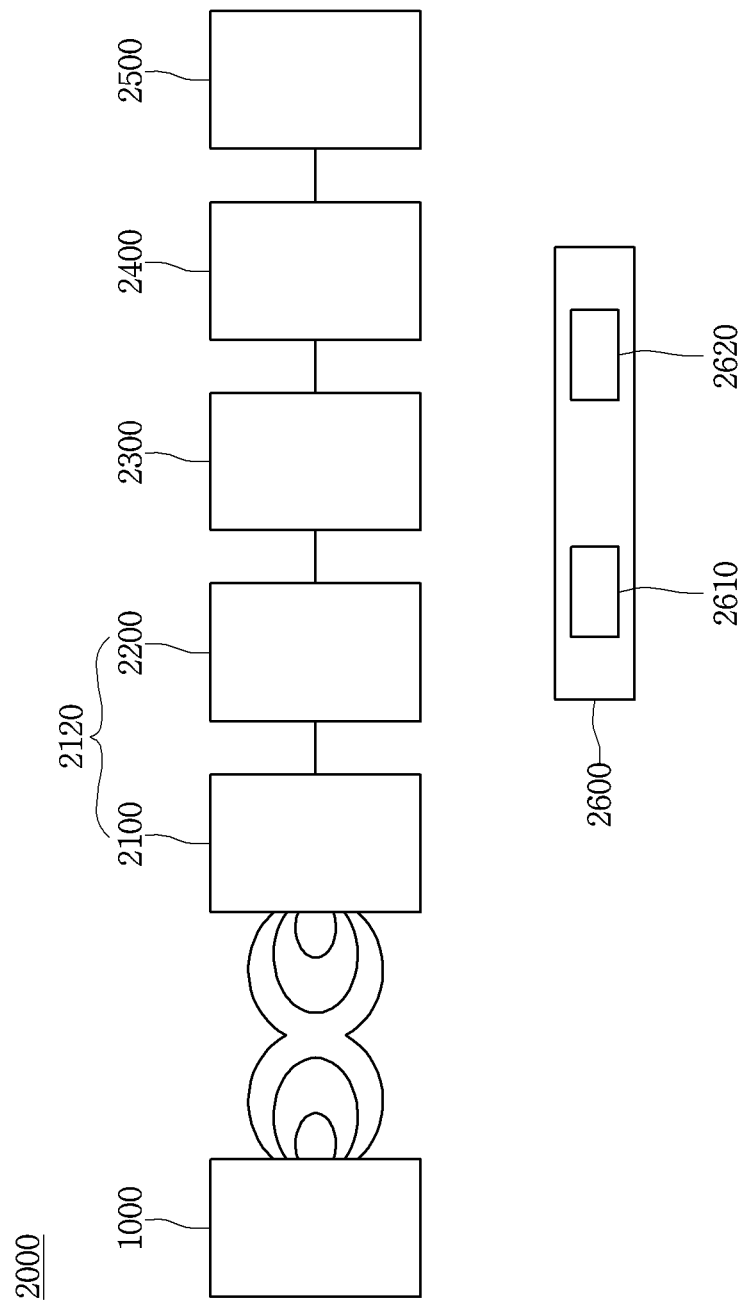

[Fig. 5]
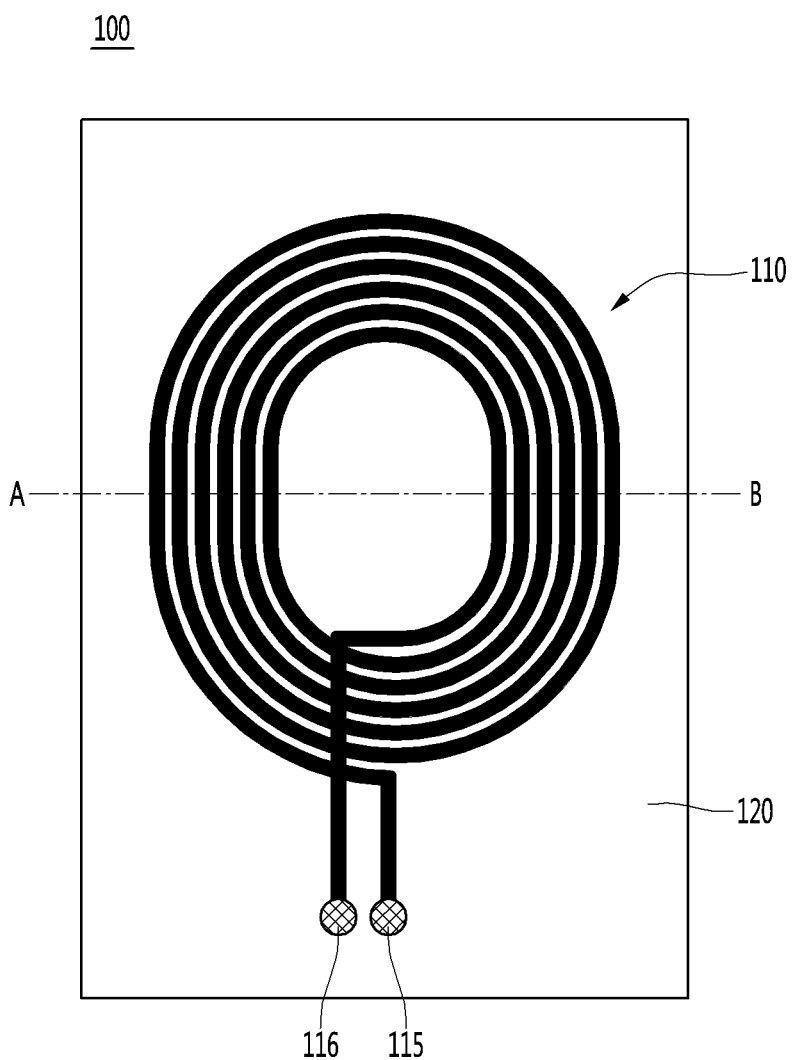

[Fig. 6]
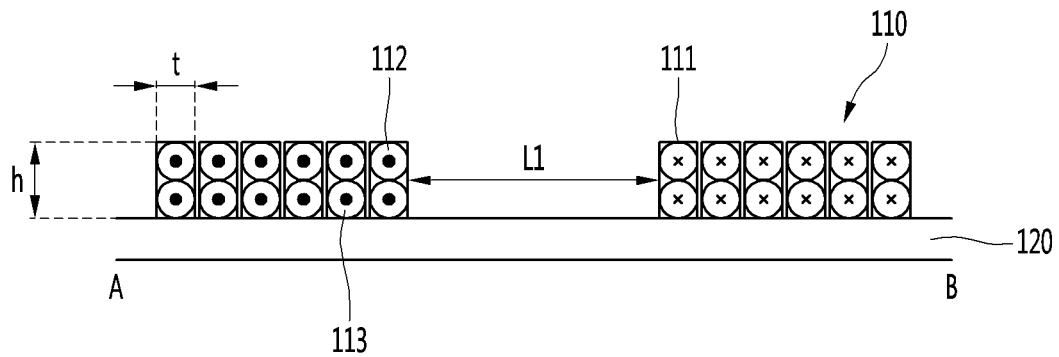
[Fig. 7]
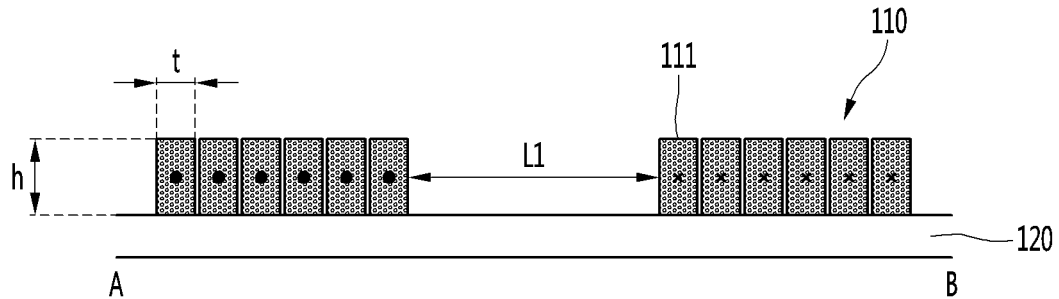
[Fig. 8]
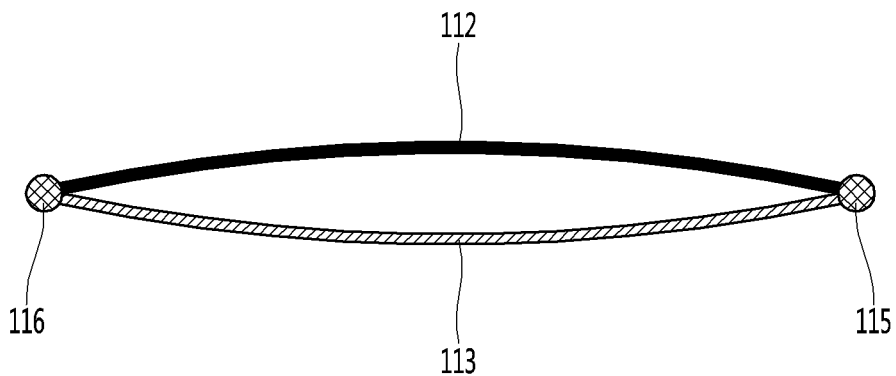

[Fig. 9]
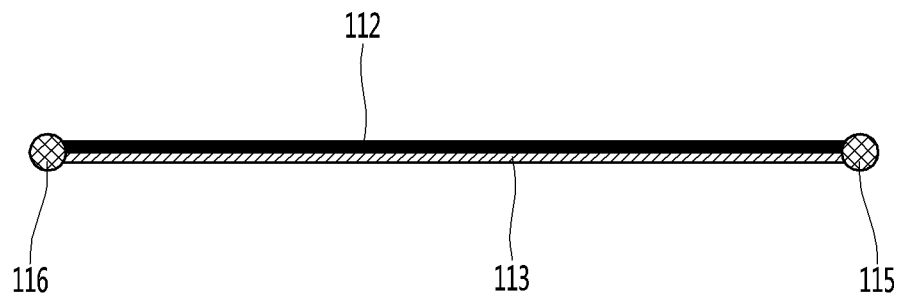
[Fig. 10]
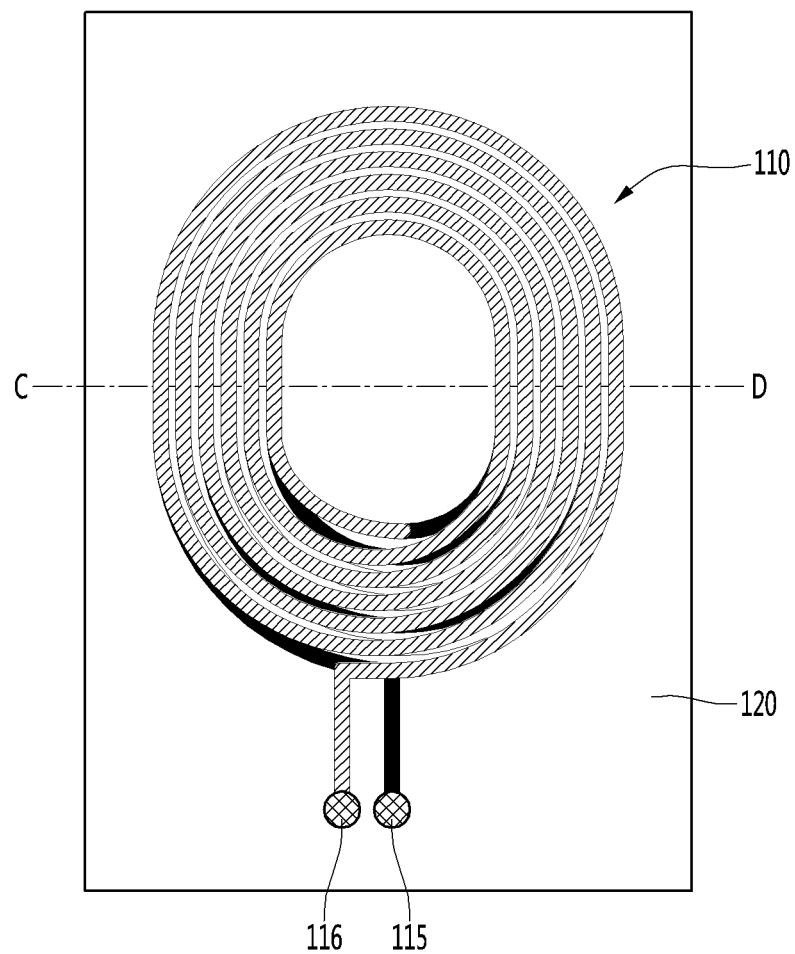

[Fig. 11]
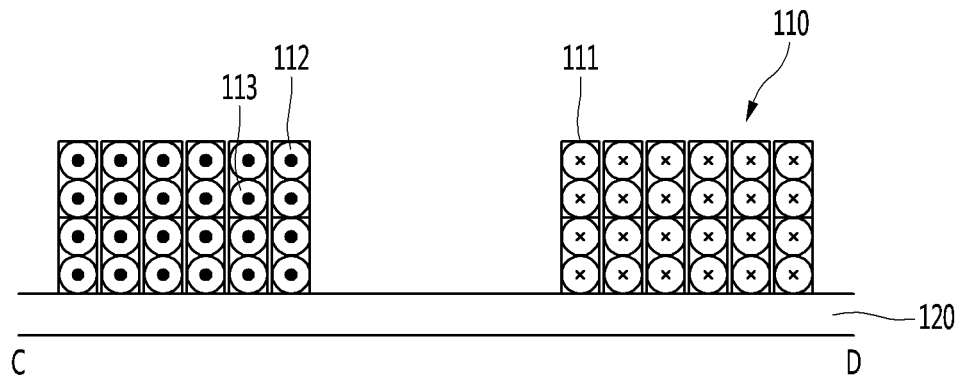
[Fig. 12]
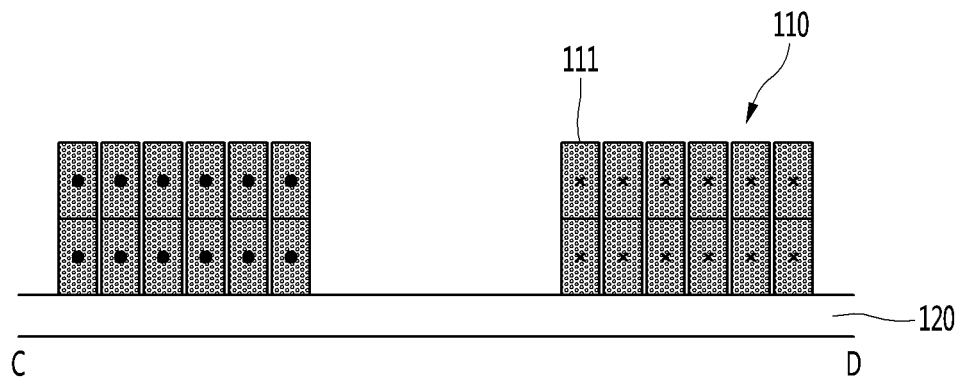
[Fig. 13]
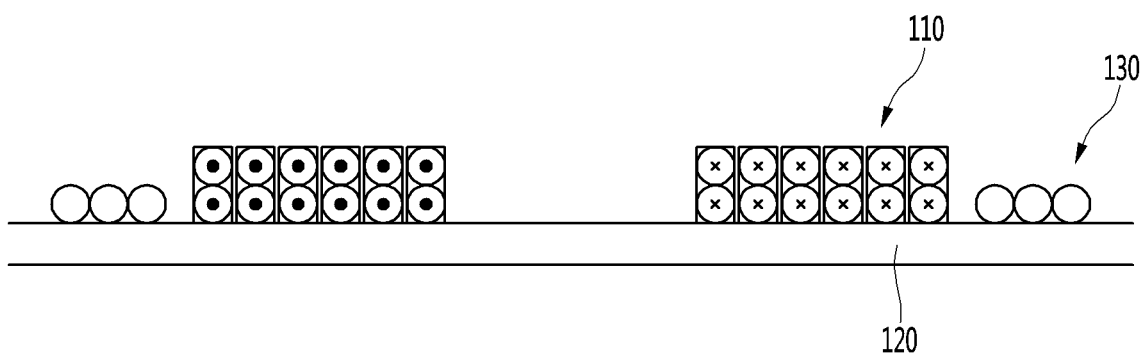

[Fig. 14]
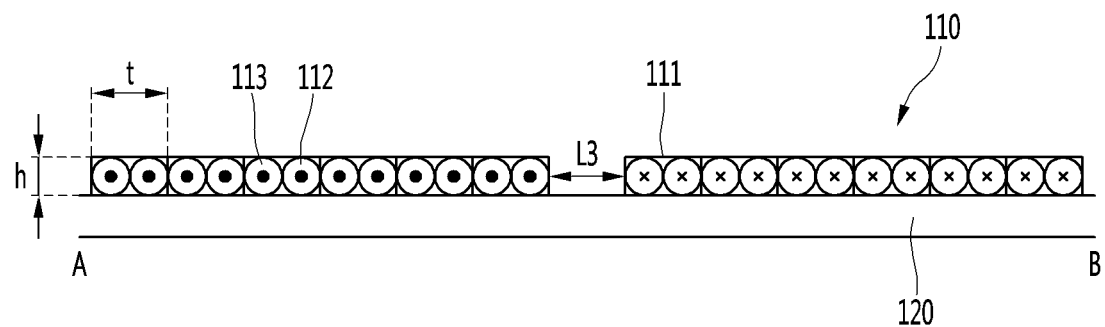
[Fig. 15]
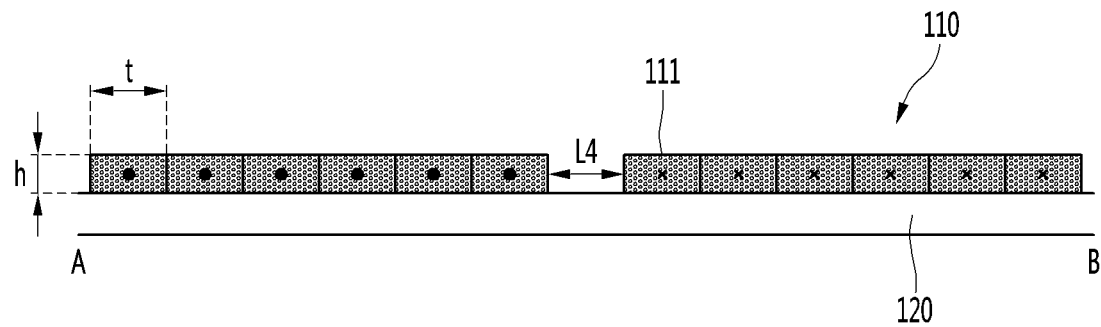

[Fig. 16]
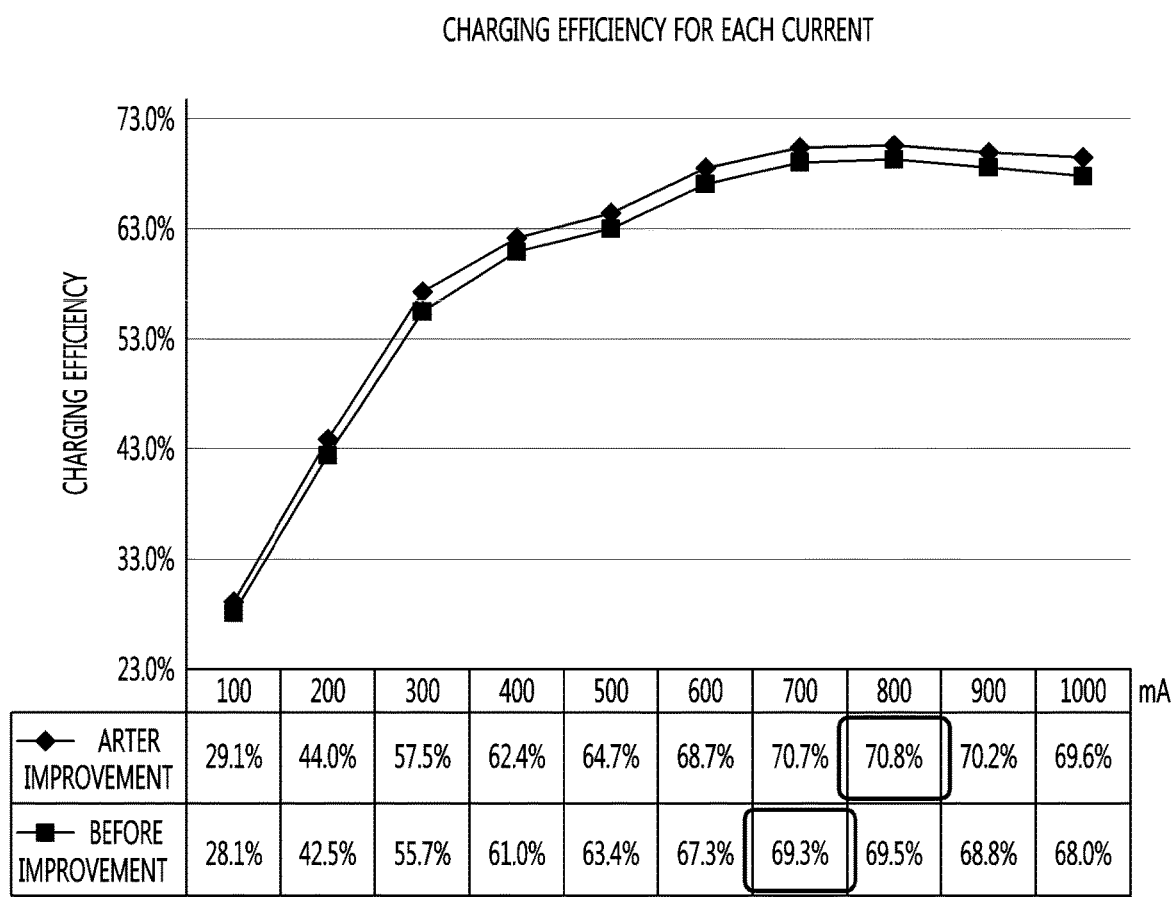

COIL DEVICE OF WIRELESS POWER TRANSFER SYSTEM

CROSS-REFERENCE TO RELATED APPLICATIONS

The present application claims priority under 35 U.S.C. 119 and 35 U.S.C. 365 to Korean Patent Application No. 10-2015-0143103 filed on Oct. 13, 2015, which is hereby incorporated by reference in its entirety.

BACKGROUND

The present disclosure relates to a coil device, a method for manufacturing the coil device, and a wireless power transfer system-charger and a wireless power transfer system-device, which include the coil device.

In general, various electronic devices are equipped with batteries and operated using power charged in the batteries. In this case, the battery is replaceable and rechargeable in the electronic device. To this end, the electronic device is equipped with a connecting terminal for a connection with an external charging device. That is, the electronic device is electrically connected with the charging device through the connecting terminal. However, as the connecting terminal in the electronic device is exposed to the outside, the connecting terminal may be contaminated with foreign matters or short-circuited due to moisture. In this case, connection failures occur between the connecting terminal and the charging device, and therefore, the battery in the electronic device may not be charged.

In order to solve the above-described problem, there has been proposed a wireless power transfer (WPT) system for charging electronic devices by wireless.

The WPT system is a technology for transferring power by wireless through a space, and maximizes convenience of supplying power to mobile devices and digital home appliances.

The WPT system has advantages of power saving through real-time control of the use of power, the overcoming of space limitation of power supply, reduction in amount of waste batteries using battery recharging, and the like.

Representative examples of a scheme for implementing the WPT system are a magnetic induction scheme and a magnetic resonance scheme. The magnetic induction scheme is a non-contact energy transfer technology in which, when two coils approach each other, an electromotive force is generated in the other coil by the medium of magnetic flux generated as current flows in one coil, and a frequency of a few hundreds of kHz may be used in the magnetic induction scheme. The magnetic resonance scheme is a magnetic resonance technology using only electric or magnetic fields without using electromagnetic waves or current. In the magnetic resonance scheme, the distance at which power transfer is possible is a few meters or more, and hence a frequency of a few MHz may be used.

The WPT system includes a WPT system-charger for transferring power by wireless and a WPT system-device for receiving power to charge loads such as batteries. There has been developed a WPT system-charger which can select a charging scheme of a WPT system-device, i.e., any one of the magnetic induction scheme and the magnetic resonance scheme, and transfer power by wireless, corresponding to the charging scheme of the WPT system-device.

The PWT system may transfer power in such a manner that transfers, by wireless, an electromotive force induced on a coil.

As PWT systems become smaller in size, a space for disposing a coil is limited. In addition, when the coil becomes thin to increase the number of windings thereof, the resistance of the coil is increased, thereby lowering charging efficiency.

SUMMARY

Embodiments provide a coil device of a wireless power transfer system, in which inductance increases and resistance decreases, thereby improving a quality factor.

Embodiments also provide a coil device of a wireless power transfer system, in which the mounting area of a coil on a substrate is decreased, thereby increasing the number of windings of the coil.

In one embodiment, a coil device includes: a substrate; and a coil disposed while turning at least once on one surface of the substrate, wherein the height of a section of the coil, which is vertical to the one surface of the substrate, is longer than the width of the section of the coil, which is parallel to the one surface of the substrate.

The coil may include a plurality of wires connected between first and second terminals on the substrate, the plurality of wires being self-bonded.

Each of the plurality of wires may be a solid wire.
The coil may be a flat type copper wire.
Each of the plurality of wires may be a litz wire.
The coil may be an induction coil or a resonance coil.

In another embodiment, a coil device includes: a substrate including first and second terminals; and a first coil disposed on one surface of the substrate, the first coil being disposed while turning at least once, wherein the first coil includes a plurality of wires self-bonded to be stacked on the substrate, wherein one sides of the plurality of wires are commonly connected to the first terminal, and the other sides of the plurality of wires are commonly connected to the second terminal.

Each of the plurality of wires may be a solid wire.
Each of the plurality of wires may be a litz wire.
Each of the plurality of wires may be a flat type copper wire.
The first coil may be an induction coil.
The coil device may further include a second coil including a plurality of wires self-bonded to be stacked on the substrate. The second coil may be a resonance coil.

In still another embodiment, a method for manufacturing a coil device includes: preparing a substrate including first and second terminals; self-bonding a plurality of wires to be stacked on the substrate; and disposing the plurality of wires on the substrate and connecting the plurality of wires to the first and second terminals.

Each of the plurality of wires may be a solid wire.
Each of the plurality of wires may be a litz wire.

The details of one or more embodiments are set forth in the accompanying drawings and the description below. Other features will be apparent from the description and drawings, and from the claims.

BRIEF DESCRIPTION OF THE DRAWINGS

FIG. 1 is an equivalent circuit of a magnetic induction scheme.

FIG. 2 is an equivalent circuit of a magnetic resonance scheme.

FIGS. 3a and 3b are block diagrams showing a wireless power transfer system-charger as one of sub-systems constituting a wireless power transfer system.

FIGS. 4a and 4b are block diagrams showing a wireless power transfer system-device as one of sub-systems constituting the wireless power transfer system.

FIG. 5 is a top view illustrating coil devices according to first and second embodiments.

FIG. 6 is a sectional view taken along one-dotted chain line A-B of FIG. 5 as the coil device according to the first embodiment.

FIG. 7 is a sectional view taken along one-dotted chain line A-B of FIG. 5 as the coil device according to the second embodiment.

FIGS. 8 and 9 are views schematically illustrating a self-bonded wire.

FIG. 10 is a top view illustrating coil devices according to third and fourth embodiments.

FIG. 11 is a sectional view taken along one-dotted chain line C-D of FIG. 10 as the coil device according to the third embodiment.

FIG. 12 is a sectional view taken along one-dotted chain line C-D of FIG. 10 as the coil device according to the fourth embodiment.

FIG. 13 is a sectional view illustrating a coil part further including an NFC coil.

FIGS. 14 and 15 are sectional views illustrating coil devices according to comparative examples.

FIG. 16 is a graph of charging efficiency versus current on a coil.

DETAILED DESCRIPTION OF THE EMBODIMENTS

Hereinafter, a coil device, a method for manufacturing the coil device, and a wireless power transfer system-charger and a wireless power transfer system-device, which include the coil device, according to an embodiment will be described with reference to accompanying drawings. Although embodiments have been described with reference to a number of illustrative embodiments thereof, it should be understood that numerous other modifications and embodiments can be devised by those skilled in the art that will fall within the spirit and scope of the principles of this disclosure. The thickness and size of an apparatus shown in the drawings may be exaggerated for the purpose of convenience or clarity. The same reference numerals denote the same elements throughout the specification.

The embodiment selectively uses various types of frequency bandwidths in the range of a low frequency wave (50 kHz) to a high frequency wave (15 MHz) for transmitting wireless power, and requires a support of a communication system which is capable of exchanging data and control signals for system control.

The embodiment can be applied to various industrial fields including a mobile terminal industry, a smart watch industry, a computer and notebook computer industry, a home appliance industry, an electric vehicle industry, a medical device industry, a robot industry, and the like, which use batteries or use electronic devices requiring the batteries.

The embodiment may include a system capable of transferring power to one or more devices by using one or a plurality of transfer coils constituting the device.

According to the embodiment, it is possible to solve a problem in that power of a battery runs short in a mobile device such as a smart phone or notebook computer. For example, if a smart phone or notebook computer is used in a state in which the smart phone or notebook computer is put on a wireless charging pad placed on a table, a battery is automatically charged, so that the smart phone or notebook computer can be used for a long period of time. In addition, if wireless charging pads are installed in public areas such as cafes, airports, taxies, offices, and restaurants, various mobile devices can be charged regardless of charging terminals different for every mobile device manufacturer. In addition, if a wireless power transfer technology is applied to home appliances such as cleaners and electric fans, it is unnecessary for users to look for power cables. Thus, as complicated electric wires disappear, wiring in buildings is reduced, and the utilization of spaces is improved. When an electric vehicle is charged using a current household power source, it takes a lot of time. On the other hand, if high power is transferred through the wireless power transfer technology, charging time can be reduced. In addition, if a wireless charging facility is installed under the bottom of a parking lot, it is possible to solve inconvenience that power cables should be prepared near electric vehicles.

According to the embodiment, the problem of low battery for mobile devices such as smartphones and laptops can be solved. For example, when the smartphone and the laptop are seated and used on a wireless charging pad on a table, the battery is automatically charged and used for a long period of time. In addition, when the wireless charging pad is installed at public areas such as coffee shops, airports, taxis, offices, and restaurants, various mobile devices can be charged regardless of charging terminals which may vary depending on the manufacturer of the mobile device. Further, when the wireless power transfer technology is employed in electrical appliances such as vacuum cleaners, and electric fans, users may not need to look for the power cable, and tangled electrical cables can be eliminated at home so wirings in buildings can be reduced and space can be more efficiently utilized. In addition, a long period of time is required when an electric vehicle is charged by a typical household power source. However, when a high amount of power is transferred through the wireless power transfer technology, charging time can be reduced, and when wireless charging equipment is installed at a floor of a parking lot, an inconvenience of preparing a power cable in the vicinity of the electrical vehicle can be relieved.

Terms and abbreviations used in the embodiment are as follows.

A wireless power transfer system may refer to a system that provides wireless power transfer in a magnetic field region.

A wireless power transfer system-charger (power transfer unit (PTU)) is a device that provides wireless power transfer to a power receiver in a magnetic field region and manages the entire system, and may be referred to as a transmitting device or transmitter.

A wireless power receiver system-device (power receiver unit (PRU)) is a device that receives wireless power transfer from a power transmitter in a magnetic field region, and may be referred to as a receiving device or receiver.

A charging area is an area in which actual wireless power transfer is performed in a magnetic field region, and may be changed depending on the size, required power, and operating frequency of an application product.

An S parameter (scattering parameter) is a ratio of an input voltage to an output voltage, and may mean a ratio (transmission; S21) of input port versus output port or a self-reflection value of each input/output port, i.e., a value (reflection; S11 or S22) of an output reflected and returned by an input of each input/output port.

As for a quality factor Q, a value of Q in a resonant state represents a quality of frequency selection. As the value of Q is higher, a resonance characteristic is better. Also, the value of Q may be expressed as a ratio of stored energy to energy loss in a resonator.

The principle of transferring power by wireless will be described. The wireless power transfer principle is largely divided into a magnetic induction scheme and a magnetic resonance scheme.

The magnetic induction scheme is a non-contact energy transfer technology in which, when a source inductor Ls and a load inductor Ll approach each other, an electromotive force is generated in the load inductor Ll by the medium of magnetic flux generated as current flows in the source inductor Ls. In addition, the magnetic resonance scheme is a technology for transferring energy by wireless using a resonance technique in which as magnetic resonance is generated by a natural frequency between two resonators by coupling the two resonators, the two resonators form electric and magnetic fields in the same wavelength range while being vibrated at the same frequency.

FIG. 1 is an equivalent circuit of a magnetic induction scheme.

Referring to FIG. 1, in the equivalent circuit of the magnetic induction scheme, a wireless power transfer system-charger may be implemented by a source voltage Vs according to a device for supplying power, a source resistance Rs, a source capacitor Cs for impedance matching, and a source coil Ls for a magnetic coupling with a wireless power transfer system-device. The wireless power transfer system-device may be implemented by a load resistance Rl that is an equivalent resistance of the wireless power transfer system-device, a load capacitor Cl for impedance matching, and a load coil Ll for the magnetic coupling with the wireless power transfer system-charger, in which the degree of magnetic coupling between the source coil Ls and the load coil Ll may be denoted as a mutual inductance Msl.

In FIG. 1, a ratio S21 of an input voltage to an output voltage is calculated from a magnetic induction equivalent circuit including only a coil without the source capacitor Cs and the load capacitor Cl for the impedance matching, and a maximum power transfer condition is found from the calculation. Then, the maximum power transfer condition satisfies the following Equation 1.

$$Ls/Rs = Ll/Rl \quad \text{Equation 1}$$

According the Equation 1, maximum power transfer is possible when a ratio of an inductance of the transmission coil Ls to the source resistance Rs is equal to that of an inductance of the load coil Ll to the load resistance Rl. Since a capacitor for compensating for a reactance does not exist in a system in which only an inductance exist, a self-reflection value S11 of an input/output port at a position on which maximum power transfer becomes 0, and maximum transfer efficiency may be varied according to the mutual inductance Msl. Therefore, the source capacitor Cs as a compensation capacitor for impedance matching may be added to the wireless power transfer system-charger, and the load capacitor Cl as a compensation capacitor for impedance matching may be added to the wireless power transfer system-device. The compensation capacitors Cs and Cl, for example, may be connected in series or parallel to the source coil Ls and the load coil Ll, respectively. In addition to the compensation capacitors, passive elements such as an additional capacitor and an additional inductor may be further added to each of the wireless power transfer system-charger and the wireless power transfer system-device.

FIG. 2 is an equivalent circuit of a magnetic resonance scheme.

Referring to FIG. 2, in the equivalent circuit of the magnetic resonance scheme, a wireless power transfer system-charger is implemented by a source coil forming a closed loop circuit through a serial connection of a source voltage Vs, a source resistance Rs, and a source inductor Ls, and a transfer-side resonant coil forming a closed loop circuit through a serial connection of a transfer-side resonant inductor L1 and a transfer-side resonant capacitor C1. A wireless power transfer system-device is implemented by a load coil forming a closed loop circuit through a serial connection of a load resistance Rl and a load inductor Ll, and a receiver-side resonant coil forming a closed loop circuit through a serial connection of a receiver-side resonant inductor L2 and a receiver-side resonant capacitor C2. The source inductor Ls and the transfer-side inductor L1 are magnetically coupled in a coupling coefficient of K01, the load inductor Ll and the receiver-side resonant inductor L2 are magnetically coupled in a coupling coefficient of K23, and the transfer-side resonant inductor L1 and the receiver-side resonant inductor L2 are magnetically coupled in a coupling coefficient of K12. In another embodiment, the equivalent circuit of the magnetic resonance scheme may be implemented by only the transfer-side coil and the receiver-side coil without the source coil and/or the load coil.

In the magnetic resonance scheme, most of the energy in a resonator of the wireless power transfer system-charger is transferred to a resonator of the wireless power transfer system-device when the resonance frequencies of the two resonators are the same, so that the power transfer efficiency can be improved. In addition, the efficiency of the magnetic resonance scheme becomes better when the following Equation 2 is satisfied.

$$k/\Gamma \gg 1 (k \text{ is a coupling coefficient, and } \Gamma \text{ is a damping ratio}) \quad \text{Equation 2}$$

In the magnetic resonance scheme, elements for the impedance matching may be added to improve the efficiency, and the impedance matching elements may be passive elements such as an inductor and a capacitor.

A wireless power transfer system for transferring power in the magnetic induction scheme or the magnetic resonance scheme based on the wireless power transfer principle will be described below.

<Wireless Power Transfer System-Charger>

FIGS. 3a and 3b are block diagrams showing a wireless power transfer system-charger as one of sub-systems constituting a wireless power transfer system.

Referring to FIG. 3a, the wireless power transfer system according to the embodiment may include a wireless power transfer system-charger 1000 and a wireless power transfer system-device 2000 that receives power by wireless from the wireless power transfer system-charger 1000. The wireless power transfer system-charger 1000 may include a transfer-side power converting unit 101, a transfer-side resonant circuit unit 102, and a transfer-side control unit 103. Here, the transfer-side power converting unit 101 performs power conversion on an input AC signal to output an AC signal, and the transfer-side resonant circuit unit 102 generates a magnetic field on the basis of the AC signal output from the transfer-side power converting unit 101 to provide power to the wireless power transfer system-device 200 in a charging area. Also, the transfer-side control unit 103 controls the power conversion of the transfer-side power converting unit 101, controls the amplitude and frequency of an output signal of the transfer-side power converting unit 101, performs impedance matching of the transfer-side resonant circuit unit 102, senses information on impedance, voltage, and current from the transfer-side power converting unit 101 and the transfer-side resonant circuit unit 102, and performs wireless communication with the wireless power transfer system-device 2000. The transfer-side power converting unit 103 may include at least one of a power converting unit for converting an AC signal to a DC signal, a power converting unit for outputting a DC signal by varying a level of the DC signal, and a power converting unit for converting a DC signal to an AC signal. In addition, the transfer-side resonant circuit unit 102 may include a coil and an impedance matching unit capable of resonating with the coil. In addition, the transfer-side control unit 103 may include a sensing unit for sensing information on impedance, voltage, and current and a wireless communication unit.

Referring to FIG. 3b, the wireless power transfer system-charger 1000 may include a transfer-side AC/DC converting unit 1100, a transfer-side DC/AC converting unit 1200, a transfer-side impedance matching unit 1300, a transfer coil unit 1400, and a transfer-side communication and control unit 1500.

The transfer-side AC/DC converting unit 1100 is a power converter which converts an AC signal received from the outside to a DC signal under the control of the transfer-side communication and control unit 1500. The transfer-side AC/DC converting unit 1100 may be a sub-system including a rectifier 1110 and a transfer-side DC/DC converter 1120. The rectifier 1110 is a system for converting the supplied AC signal to the DC signal. A diode rectifier having a relatively high efficiency when operating at high frequencies, a synchronous rectifier prepared as one-chip, or a hybrid rectifier by which cost and space can be reduced and having a high freedom of a dead time may be used as an embodiment for implementing the rectifier 1110. However, the present disclosure is not limited thereto, and any system for converting an AC signal to a DC signal may be applied. In addition, the transfer-side DC/DC converter 1120 controls a level of the DC signal provided by the rectifier 1100 under the control of the transfer-side communication and control unit 1500. A buck converter which lowers a level of the input signal, a boost converter which increases the level of the input signal and a buck boost converter or a Cuk converter which lowers or increases the level of the input signal may be used and as an embodiment for implementing the transfer-side DC/DC converter 1120. Also, the transfer-side DC/DC converter 1120 may include a switching device which controls a power conversion, an inductor and a capacitor which smooth the output voltage, and a transformer which modifies a voltage gain or performs an electrical separation (insulation) function, and remove a ripple component or a pulsation component (AC component included in DC component) included in the DC signal. Further, an error between a command value of the output signal of the transfer-side DC/DC converter 1120 and an actual output value may be controlled through a feedback, scheme, which can be performed by the transfer-side communication and control unit 1500.

The transfer-side DC/AC converting unit 1200 is a system capable of converting the DC signal outputted from the transfer-side AC/DC converting unit 1100 to the AC signal under the control of the transfer-side communication and control unit 1500 and controlling a frequency of the converted AC signal. A half bridge inverter or a full bridge inverter may be used as an embodiment for implementing the transfer-side DC/AC converter 1200. In addition, various amplifiers for converting a DC signal to an AC signal can be applied to the wireless power transfer system, and examples of the amplifiers are, for example, class A, B, C, E, and F amplifiers. Also, the transfer-side DC/AC converting unit 1200 may include an oscillator to generate the frequency of the output signal and a power amplifying unit to amplify the output signal.

The configuration of the AC/DC converting unit 1100 and the transfer-side DC/AC converting unit 1200 may be replaced by an AC power supplier, and may be omitted or be replaced by another configuration.

The transfer-side impedance matching unit 1300 minimizes a reflection wave at a position at which impedances are different, thereby improving the flow of a signal. Since two coils of the wireless power transfer system-charger 1000 and the wireless power transfer system-device 2000 are spatially separated from each other, a large amount of magnetic field is leaked, so that the efficiency of power transfer can be improved by compensating for the impedance difference between two connecting parts of the wireless power transfer system-charger 1000 and the wireless power transfer system-device 2000. The transfer-side impedance matching unit 1300 may include at least one of an inductor, a capacitor and a resistor, and may modify an impedance value for the impedance matching by varying an inductance of the inductor, a capacitance of the capacitor and a resistance value of the resistor under the control of the transfer-side communication and control unit 1500. In addition, when the wireless power transfer system transfers power by the magnetic induction scheme, the transfer-side impedance matching unit 1300 may have a serial resonance structure or a parallel resonance structure, and energy loss can be minimized by increasing an induction coupling coefficient between the wireless power transfer system-charger 1000 and the wireless power transfer system-device 2000. Further, when the wireless power transfer system transfers power by the magnetic resonance scheme, the transfer-side impedance matching unit 1300 allows the impedance to be matched in real-time according to a change in the distance between the wireless power transfer system-charger 1000 and the wireless power transfer system-device 2000 or mutual influence from metallic foreign objects (FO) and various devices, and a multiple matching scheme using a capacitor, a matching scheme using multiple antennas, a scheme using multiple loops may be used for the compensation scheme.

The transfer-side coil unit 1400 may be implemented by a plurality of coils or a single coil. When the transfer-side coil unit 1400 includes a plurality of coils, the coils may be spaced apart from each other or overlapping. When the coils are overlapping, an overlapped area may be determined by taking a deviation of the magnetic flux density into consideration. In addition, the transfer-side coil unit 1400 may be produced by taking an internal resistance and a radiation resistance into consideration. In this case, if the resistance component is small, the quality factor and the transmission efficiency can be improved.

The communication and control unit 1500 may be a sub-system including a transfer-side controller 1510 and a transfer-side communication unit 1520. The transfer-side controller 1510 may function to control the output voltage (or current (Itx_coil) flowing in a transfer coil) of the transfer-side AC/DC converting unit 1100 by considering an amount of required power, a currently charged amount, a voltage (Vrect) of a rectifier output part of the wireless power transfer system-device 2000, a charging efficiency of each of a plurality of wireless power transfer system-devices, and a wireless power scheme. In addition, the power to be transmitted may be controlled by generating a frequency and a switching waveform to drive the transfer-side DC/AC converting unit 1200 by taking the maximum power transmission efficiency into consideration. Further, an algorithm, a program or an application required for the control which is read from a storage unit (not shown) of the wireless power transfer system-device 2000 may be used to control an overall operation of the wireless power transfer system-device 2000. Meanwhile, the transfer-side controller 1510 may signify a microprocessor, a micro-controller unit or a micom. The transfer-side communication unit 1520 may communicate with a receiver-side communication unit 2620, and a near field communication scheme such as Bluetooth, NFC, or Zigbee may be used as an example of a communication scheme. The transfer-side communication unit 1520 and the receiver-side communication unit 2620 may transceive charging status information and charging control command with each other. In addition, the charging status information may include a number of wireless power transfer system-devices 2000, a residual energy of a battery, a number of charging operations, an amount of usage, a capacity of the battery, a ratio of the battery, and an amount of transferred power of the wireless power transfer system-charger 1000. Also, the transfer-side communication unit 1520 may transmit a charging function control signal to control a charging function of the wireless power transfer system-device 2000, and the charging function control signal may indicate to enable or disable for receiving wireless power of controlling the wireless power transfer system-device 2000.

As described above, the transfer-side communication unit 1520 may communicate using an out-of-band scheme in which the transfer-side communication unit 1520 is configured as a separate module. However, the present disclosure is not limited thereto, and the transfer-side communication unit 1520 may communicate in an in-band scheme in which the wireless power transfer system-device transfers a feedback signal to the wireless power transfer system-charger using a power signal transferred by the wireless power transfer system charger, and the wireless power transfer system-charger transfers a signal to the wireless power transfer system-device using a frequency (frequency shift) of the power signal transferred by the wireless power transfer system-charger. For example, the wireless power transfer system-device may modulate a feedback signal to transfer information on a charging start, a charging end, a battery status, and the like to the wireless power transfer system-charger through the feedback signal. In addition, the transfer-side communication unit 1520 may be configured separately from the transfer-side controller 1510, and the receiver-side communication unit 2620 of the wireless power transfer system-device 2000 may be included in a controller 2610 of the wireless power transfer system-device 2000 or be configured separately from the controller 2610.

In addition, the wireless power transfer system-charger 100 of the wireless power transfer system according to the embodiment may further include a detecting unit 1600.

The detecting unit 1600 may detect at least one of an input signal of the transfer-side AC/DC converting unit 1100, an output signal of the transfer-side AC/DC converting unit 1100, an input signal of the transfer-side DC/AC converting unit 1200, an output signal of the transfer-side DC/AC converting unit 1200, an input signal of the transfer-side impedance matching unit 1300, an output signal of transfer-side impedance matching unit 1300, an input signal of the transfer-side coil unit 1400, and a signal on the transfer-side coil unit 1400. For example, the signal may include at least one of information on current, information on voltage, and information on impedance. The detected signal is fed back to the communication and control unit 1500, and the communication and control unit 1500 may control the transfer-side AC/DC converting unit 1100, the transfer-side DC/AC converting unit 1200, and the transfer-side impedance matching unit 1300, based on the detected signal. Also, the communication and control unit 1500 may perform a foreign object detection (FOD), based on a detection result of the detecting unit 1600. In addition, the detected signal may be one of voltage and current. Meanwhile, the detecting unit 1600 may be configured as hardware different from the communication control unit 1500, or the detecting unit 1600 and the communication control unit 1500 may be implemented as single hardware.

<Wireless Power Transfer System-Device>

FIGS. 4*a* and 4*b* are block diagrams showing a wireless power transfer system-device as one of sub-systems constituting the wireless power transfer system.

Referring to FIG. 4*a*, the wireless power transfer system according to the embodiment may include the wireless power transfer system-charger 1000 and the wireless power transfer system-device 2000 which receives power by wireless from the wireless power transfer system-charger 1000. The wireless power transfer-system-device 2000 may include a receiver-side resonant circuit unit 201, a receiver-side power converting unit 202, and a receiver-side control unit 203. Here, the receiver-side resonant circuit unit 201 receives an AC signal transferred from the wireless power transfer system-charger 1000, and the receiver-side power converting unit 202 performs power conversion on the AC signal from the receiver-side resonant circuit unit 201 to output a DC signal. Also, the receiver-side control unit 203 receives the DC signal output from the receiver-side power converting unit 202 to sense a charged load 2500 and a voltage/current of the receiver-side resonant circuit unit 201, performs impedance matching of the receiver-side resonant circuit unit 201, controls power conversion of the receiver-side power converting unit 201, controls a level of the output signal of the receiver-side power converting unit 202, senses an input/output voltage or current of the receiver-side power converting unit 202, control the supply of the output signal of the receiver-side power converting unit 202 to the load 2500, or communicates with the wireless power transfer system-charger 1000. In addition, the receiver-side power converting unit 202 may include at least one of a power converting unit for converting an AC signal to a DC signal, a power converting unit for outputting a DC signal by varying a level of the DC signal, and a power converting unit for converting a DC signal to an AC signal.

Referring to FIG. 4*b*, the wireless power transfer system may include the wireless power transfer system-charger 1000 and the wireless power transfer system-device 2000 which receives power by wireless from the wireless power transfer system-charger 1000. The wireless power transfer system-device 2000 may include a receiver-side resonant circuit unit 2120 configured with a receiver-side coil unit 2100 and a receiver-side impedance matching unit 220, a receiver-side AC/DC converting unit 2300, a receiver-side DC/DC converting unit 2400, a load 2500, and a receiver-side communication and control unit 2600. In addition, the receiver-side AC/DC converting unit 2300 may signify a rectifying unit that rectifies an AC signal to a DC signal.

The receiver-side coil unit 2100 may receive power through the magnetic induction scheme or the magnetic resonance scheme. Accordingly, the receiver-side coil unit 2100 may include at least one of an induction coil and a resonance coil according to the power reception scheme.

As an embodiment, the receiver-side coil unit 2100 may be disposed together with a near field communication (NFC) antenna in a mobile terminal. In addition, the receiver-side coil unit 2100 may be the same as the transfer-side coil unit 1400, and a specification of a reception antenna may vary according to an electrical characteristic of the wireless power transfer system-device 2000.

The receiver-side impedance matching unit 2200 may perform impedance matching between the wireless power transfer system-charger 1000 and the wireless power transfer system-device 2000.

The receiver-side AC/DC converting unit 2300 generates a DC signal by rectifying an AC signal output from the receiver-side coil unit 2100. In addition, an output voltage of the receiver-side AC/DC converting unit 2300 may signify a rectification voltage Vrect. The receiver-side communication and control unit 2600 may detect or vary the output voltage of the receiver-side AC/DC converting unit 2300. The receiver-side communication and control unit 2600 may transfer, to the wireless power transfer system-charger 1000, status parameter information such as information on a minimum rectification voltage Vrect_min (or minimum output voltage Vrect_min), which is a minimum value of the output voltage of the receiver-side AC/DC converting unit 2300, a maximum rectification voltage Vrect_max (or maximum output voltage Vrect_max), which is a maximum value of the output voltage of the receiver-side AC/DC converting unit 2300, and an optimal rectification voltage Vrect_set (or optimal output voltage Vrect_set), which has any one of the minimum value and the maximum value.

The receiver-side DC/AC converting unit 2400 may control a level of the DC signal outputted by the receiver-side AC/DC converting unit 2300 in match with the capacitance of the load 2500.

The load 2500 may include a battery, a display, an audio output circuit, a main processor, a battery manager, and various sensors. The load 2500, as shown in FIG. 4a, may at least include a battery 2510 and a battery manager 2520. The battery manager 2520 may control the voltage and current applied to the battery 2510 by sensing a charging state of the battery 2510.

The receiver-side communication and control unit 2600 may be activated by a wake-up power from the transfer-side communication and control unit 1500, communicate with the transfer-side communication and control unit 1500, and control a sub-system of the wireless power transfer system-device 2000.

The wireless power transfer system-device 2000 may be provided in a single number or plural numbers to simultaneously receive energy by wireless from the wireless power transfer system-charger 1000. That is, in the wireless power transfer system using the magnetic resonance scheme, a plurality of wireless power transfer system-devices 2000 may receive power from one wireless power transfer system-charger 1000. In this case, the transfer-side impedance matching unit 1300 of the wireless power transfer system-charger 1000 may adaptively perform impedance matching between the plurality of wireless power transfer system-devices 2000. This may be similarly employed even when the magnetic induction scheme includes a plurality of coil units which are independent from each other.

In addition, when a plurality of wireless power transfer system-devices 2000 are provided, the systems may have the same power reception scheme or different power reception schemes. In this case, the wireless power transfer system-charger 1000 may be a system that transfers power in the magnetic induction scheme or the magnetic resonance scheme or a system that uses both of the schemes.

Meanwhile, a size and a frequency of the signal of the wireless power transfer system will be described. In the case of the magnetic induction scheme, the receiver-side AC/DC converting unit 1100 in the wireless power transfer system-charger 10000 may receive an AC signal of a few tens or hundreds of V (e.g., 110 V to 220 V) and a few tens or hundreds of Hz (e.g., 60 Hz), convert the AC signal to a DC signal of a few or tens of V (e.g., 10 V to V), and output the DC signal. The transfer-side DC/AC converting unit 1200 in the wireless power transfer system-charger 10000 may receive the DC signal and output an AC signal of a few hundreds of kHz (e.g., 125 kHz). In addition, the receiver-side AC/DC converting unit 2300 in the wireless power transfer system-device 2000 may receive the AC signal of a few hundreds of kHz (e.g., 125 kHz), convert the AC signal to a DC signal of a few or tens of V (e.g., 10 V to 20 V), and output the DC signal. The receiver-side DC/DC converter 2400 in the wireless power transfer system-device 2000 may output the DC signal, for example a DC signal of 5 V, appropriate for the load 2500 and transfer the DC signal to the load 2500. In addition, in the case of the wireless power transfer using the magnetic resonance scheme, the transfer-side AC/DC converting unit 1100 in the wireless power transfer system-charger 1000 may receive an AC signal of a few tens or hundreds of V (e.g., 110 V to 220 V) and a few tens or hundreds of Hz (e.g., 60 Hz), convert the AC signal to a DC signal of a few or tens of V (e.g., 10 V to 20 V), and output the DC signal. The transfer-side DC/AC converting unit 1200 in the wireless power transfer system-charger 1000 may receive the DC signal and output an AC signal having a frequency of a few of MHz (e.g., 6.78 MHz). Further, the receiver-side AC/DC converter 2300 in the wireless power transfer system-device 2000 may receive the AC signal having the frequency of a few of MHz (e.g., 6.78 MHz), convert the AC signal to a DC signal having a voltage of a few or tens of V (e.g., 10 V to 20 V), and output the DC signal. In addition, the receiver-side DC/DC converting unit 2400 may output a DC signal, for example the DC signal of 5 V, appropriate for the load 2500 and transfer the DC signal to the load 2500.

<Coil Device>

FIG. 5 is a top view illustrating coil devices according to first and second embodiments. FIG. 6 is a sectional view taken along one-dotted chain line A-B of FIG. 5 as the coil device according to the first embodiment. FIG. 7 is a sectional view taken along one-dotted chain line A-B of FIG. 5 as the coil device according to the second embodiment. FIGS. 8 and 9 are views schematically illustrating a self-bonded wire.

Referring to FIG. 5, the coil device 100 according to the first embodiment is at least one of the transfer-side coil unit 1400 or the receiver-side coil unit 2100.

The coil device 100 may include a coil 110 and a substrate 120 on which the coil 110 is mounted.

The coil 110 may be an induction coil or a resonance coil. Also, the coil 110 may include first and second coils. In this case, the first coil may be an induction coil, and the second coil may be a resonance coil.

In addition, the length of a section of the coil 110 in a direction vertical to one surface of the substrate 120, i.e., the width of the section of the coil 110 may be longer than the length of the section of the coil 110 in a direction parallel to the one surface of the substrate 120, i.e., the height of the coil 110. Also, the coil 110 may include a wire 111 connected between first and second terminals 115 and 116 formed on the substrate 120.

The wire 111 may be disposed on one surface of the substrate 120. The wire 111 may be disposed on the substrate 120 while winding (turning) at least once.

Also, the wire 111 may extend from the first terminal 115 to turn plural times in the direction of an inner region of the substrate 120 from an outer region of the substrate 120, and may extend from the inner region of the substrate 120 to the second terminal 116. Therefore, the coil 110 may be disposed on one layer, i.e., the substrate 120 in a single layer. In this case, when the wire 111 extends from the inner region to the second terminal 116, the wire 111 may turn plural times to be extracted in an upper direction of the wire 111 or may turn plural times to be extracted in a lower direction of the wire 111, i.e., to extend while coming in surface contact with the substrate 120.

In addition, the coil 110 may be disposed to turn at least once on the substrate 120 in a circular shape, an elliptical shape, a racetrack shape, a quadrangular shape, or a triangular shape.

The substrate 120 may be a magnetic sheet. When the coil device 100 is the transfer-side coil unit 1400, an AC signal of the transfer-side DC/AC converting unit 1200 may be applied to the first and second terminals 115 and 116 connected to an output terminal of the transfer-side DC/AC converting unit 1200. Then, a signal input to the first terminal 115 is output to the second terminal 116 via the wire 111, and a signal input to the second terminal 116 is output to the first terminal 115 via the wire 111. When the coil device 100 is the receiver-side coil unit 2100, power induced to the coil 110 may be transferred, through the first and second terminals 115 and 116, to the receiver-side AC/DC converting unit 2300 of which input terminal is connected to the first and second terminals 115 and 116.

Referring to FIGS. 8 and 9, the coil 110 may include two wires connected between the first and second terminals 115 and 116. That is, as shown in FIG. 8, each of first and second wires 112 and 113 may be connected between the first and second terminals 115 and 116. In other words, one sides of the first and second wires 112 and 113 may be commonly connected to the first terminal 115, and the other sides of the first and second wires 112 and 113 may be commonly connected to the second terminal 116. In addition, as shown in FIG. 9, the first and second wires 112 and 113 may be self-bonded. The coil 110 includes the two wires 112 and 113, but the present disclosure is not limited thereto. For example, the coil 110 may include wires having a larger number than the two wires, and three or more wires may be self-bonded such that one sides of the wires are commonly connected to the first terminal 115 and the other sides of the wires are commonly connected to the second terminal 116.

Referring to FIG. 6, when the wire 111 includes two wires, i.e., the self-bonded first and second wires 112 and 113, the first and second wires 112 and 113 may be stacked in the direction vertical to the one surface of the substrate 120. Therefore, the length according to the height h of the wire 111 may be longer than the length according to the thickness t (i.e., the width t of the wire 111 in the direction parallel to the substrate 120).

In addition, when the wire 111 includes three or more self-bonded wires, all of the wires may be stacked in the direction vertical to the one surface of the substrate 120. In this case, the length according to the height h of the wire 111 is increased, but the thickness t (i.e., the width t of the wire 111 in the direction parallel to the substrate 120) may be maintained to be almost same.

Referring to FIG. 7, a wire 111 of the coil device 100 according to the second embodiment may be a flat type copper wire. The flat type copper wire may have a quadrangular shape, more specifically, a rectangular shape in which the widths of one side and another side perpendicular to the one surface are different from each other.

The length according to the height h of the flat type copper wire 111 may be longer than the length according to the width t of the flat type copper wire 111 in the direction parallel to the substrate 120. That is, the major axis of a section of the flat type copper wire 111 may be vertical to the one surface of the substrate 120, and the minor axis of the section of the flat type copper wire 111 may be parallel to the one surface of the substrate 120.

FIG. 10 is a top view illustrating coil devices according to third and fourth embodiments. FIG. 11 is a sectional view taken along one-dotted chain line C-D of FIG. 10 as the coil device according to the third embodiment. FIG. 12 is a sectional view taken along one-dotted chain line C-D of FIG. 10 as the coil device according to the fourth embodiment.

Referring to FIG. 10, a wire 111 may extend from a first terminal 115 to turn plural times in the direction of an inner region of a substrate 120 from an outer region of the substrate 120, and then turn plural times in the direction of the outer region of the substrate 120 from the inner region of the substrate 120 to extend to a second terminal 116. Therefore, a coil 110 may be disposed in two layers on the substrate 120. In addition, the wire 111 is not disposed in two layers but may be disposed in three or more layers on the substrate 120.

Referring to FIG. 11, in the coil device 100 according to third embodiment, at least two wires 112 and 113 may be self-bonded to be disposed in two layers on the substrate 120.

Referring to FIG. 12, the wire 111 of the coil device 100 according to the fourth embodiment may be a flat type copper wire. The wire 111 may be disposed in two layers on the substrate 120.

Meanwhile, each of the first and second wires 112 and 113 according to the first and third embodiments may be an enamel copper wire as a solid wire, and the first and second wires 112 and 113 as enamel copper wires may be self-bonded to be stacked on the substrate 120. In addition, each of the first and second wires 112 and 113 according to the first and third embodiments may be a litz wire. The litz wire refers to a copper wire obtained by twisting a plurality of superfine enamel copper wires at a certain pitch. The two litz wires may be self-bonded to be stacked on one surface of the substrate 120.

FIG. 13 is a sectional view illustrating a coil part further including an NFC coil.

Referring to FIG. 13, the coil device 100 according to the embodiment may further include an NFC coil 130 disposed on a substrate 120 while surrounding a coil 110.

Meanwhile, a method for manufacturing the coil device according to the embodiment may include a step of preparing a substrate 120 including first and second terminals 115 and 116, a step of self-bonding a plurality of wires 112 and 113 such that the plurality of wires 112 and 113 are stacked on the substrate 120, more specifically, such that the plurality of wires 112 and 113 are disposed in a direction vertical to one surface of the substrate 120, and a step of disposing the plurality of wires 112 and 113 on the substrate 120 and connecting the plurality of wires 112 and 113 to the first and second terminals 115 and 116. In addition, the coil device 100 may be the transfer-side coil unit 1400 of the wireless power transfer system-charger 1000, and may be the receiver-side coil unit 2100 of the wireless power transfer system-device 2000.

FIGS. 14 and 15 are sectional views illustrating coil devices according to comparative examples. FIG. 16 is a graph of charging efficiency versus current on a coil.

Referring to FIGS. 6 and 14, when, in a wire 111 of FIG. 14 as a comparative example, self-bonded first and second wires 112 and 113 are disposed in the direction parallel to one surface of a substrate 120, the length according to the height h of the wire 111 is shorter than the length according to the thickness t of the first and second wires 112 and 113. Therefore, in the coil device 100 according to the first embodiment of FIG. 6, the distance L1 between inner wires 111 opposite to each other in the inner region of the substrate 120 is longer than a corresponding distance L3 of FIG. 14. Thus, the area of the inner region of the substrate 120 is increased. Accordingly, in the embodiment, the coil can turn a larger number of times in the same area of the substrate 120, as compared with the comparative example.

Similarly, referring to FIGS. 7 and 15, when the minor axis of a flat type copper wire 111 of FIG. 15 as a comparative example is vertical to one surface of a substrate 120, and the major axis of the flat type copper wire 111 is parallel to the one surface of the substrate 120, the length according to the height h of the flat type copper wire 111 is shorter than the length according to the thickness t of the flat type copper wire 111. Thus, in the coil device 100 according to the second embodiment of FIG. 7, the distance L2 between inner wires 111 opposite to each other in the inner region of the substrate 120 is longer than a corresponding distance L4 of FIG. 15. Accordingly, in the embodiment, the coil can turn a larger number of times in the same area of the substrate 120, as compared with the comparative example.

TABLE 1

| | Application of AC signal with 100 kHz | | |
| --- | --- | --- | --- |
| | Inductance (L) | Resistance (R) | Quality Factor (Q) |
| Embodiment | 10.763 | 0.258 | 26.21 |
| Comparative Example | 9.28 | 0.303 | 19.24 |

Referring to Table 1, it can be seen that, in the embodiment as shown in FIGS. 6 and 7, the inductance L is increased and the resistance R is decreased as compared with the comparative example as shown in FIGS. 14 and 15. Thus, it can be seen that, in the embodiment, the quality factor Q is increased as compared with the comparative example. According to FIG. 16, it can be seen that, in the embodiment, the charging efficiency is improved under the same current flowing in the coil 110, as compared with the comparative example. Thus, when a coil device is configured by forming a wire using the same amount of metallic material, e.g., the same amount of copper in the embodiment and the comparative example, the embodiment has a smaller resistance than the comparative example. Accordingly, a small amount of power is lost, and the thickness of the wire can be decreased, thereby overcoming the space limitation of the substrate 120. In addition, when considering that it is technically very difficult to improve the charging efficiency by 1%, in the embodiment, the charging efficiency can be improved by almost 1% under the same current, as compared with the comparative example.

According to the present disclosure, it is possible to provide a coil device of a wireless power transfer system, in which a plurality of wires are self-bonded to be stacked on a substrate in a direction vertical to the substrate, and a coil including the self-bonded wires is disposed on the substrate, so that a quality factor can be increased by increasing inductance and decreasing resistance, and the area of the coil on the substrate can be reduced.

Although the present disclosure has been described in connection with the exemplary embodiments, the embodiments of the present disclosure are only for illustrative purposes and should not be construed as limiting the scope of the present disclosure. It will be understood by those skilled in the art that various changes and modifications can be made thereto within the technical spirit and scope defined by the appended claims. Therefore, the technical scope of the present disclosure should not be limited to the embodiments described, but should be defined by the claims which follow.

What is claimed is:

1. A coil device comprising:
   a substrate, wherein the substrate is a magnetic sheet; and
   a coil disposed on one surface of the substrate and including a plurality of layers, each layer being stacked in a vertical direction and including a plurality of wires,
   wherein each wire is wound in a horizontal direction and a vertical direction to form the plurality of layers,
   wherein each wire within a respective layer is positioned in a same vertical line along the vertical direction,
   wherein a height of the plurality of wires positioned in the same vertical line is greater than a width of each wire positioned in the same vertical line,
   wherein each layer is provided directly on a surface of the substrate,
   wherein the wires of each layer are aligned to the wires of an adjacent layer in the horizontal direction,
   wherein each wire is only self-bonded in the vertical direction to an adjacent wire within the respective layer, and
   wherein each layer has a flat first surface and a flat second surface opposite to the flat first surface, the plurality of layers comprises a first layer, and a second layer on the first layer, and the flat first surface of the second layer contacts the flat second surface of the first layer.

2. The coil device according to claim 1, further comprising first and second terminals connected to each wire.

3. The coil device according to claim 1, wherein each wire is a solid wire.

4. The coil device according to claim 1, wherein the coil is a flat type copper wire.

5. The coil device according to claim 1, wherein each wire is a litz wire.

6. The coil device according to claim 1, wherein the coil is an induction coil or a resonance coil.

7. A coil device comprising:
   a substrate comprising first and second terminals, wherein the substrate is a magnetic sheet; and
   a first coil disposed on one surface of the substrate and including a plurality of layers, each layer being stacked in a vertical direction and including a plurality of wires,
   wherein each wire is wound in a horizontal direction and a vertical direction to form the plurality of layers,
   wherein each wire within a respective layer is positioned in a same vertical line along the vertical direction, wherein each wire is only self-bonded in the vertical direction to an adjacent wire within the respective layer and is stacked on the substrate,
wherein a height of the plurality of wires positioned in the same vertical line is greater than a width of each wire positioned in the same vertical line,
wherein one sides of the plurality of wires are commonly connected to the first terminal, and the other sides of the plurality of wires are commonly connected to the second terminal,
wherein each layer is provided directly on a surface of the substrate,
wherein the wires of each layer are aligned to the wires of an adjacent layer in the horizontal direction, and
wherein each layer has a flat first surface and a flat second surface opposite to the flat first surface, the plurality of layers comprises a first layer, and a second layer on the first layer, and the flat first surface of the second layer contacts the flat second surface of the first layer.

8. The coil device according to claim 7, wherein each wire is a solid wire.

9. The coil device according to claim 7, wherein each wire is a Litz wire.

10. The coil device according to claim 7, wherein each wire is a flat type copper wire.

11. The coil device according to claim 7, wherein the first coil is an induction coil.

12. The coil device according to claim 11, further comprising a second coil comprising a plurality of self-bonded wires stacked on the substrate,
wherein the second coil is a resonance coil.

* * * * *